United States Patent
Mian et al.

(10) Patent No.: US 6,768,551 B2
(45) Date of Patent: Jul. 27, 2004

(54) CONTACTLESS WHEEL MEASUREMENT SYSTEM AND METHOD

(75) Inventors: Zahid F. Mian, Loudonville, NY (US); Ronald W. Gamache, East Greenbush, NY (US); Robert MacAllister, Mechanicville, NY (US)

(73) Assignee: International Electronic Machines Corp., Albany, NY (US)

( * ) Notice: Subject to any disclaimer, the term of this patent is extended or adjusted under 35 U.S.C. 154(b) by 214 days.

(21) Appl. No.: 09/981,174

(22) Filed: Oct. 17, 2001

(65) Prior Publication Data

US 2003/0072001 A1 Apr. 17, 2003

(51) Int. Cl.⁷ .......................... G01B 11/24; G01B 11/30; G01C 3/00; G01N 21/47; G01V 8/00
(52) U.S. Cl. .................. 356/446; 356/3.01; 356/604; 356/612; 356/635; 250/559.23; 250/559.24
(58) Field of Search ................................ 356/601–602, 356/604, 612–613, 3.01, 635, 446; 250/559.22, 559.23, 559.24

(56) References Cited

U.S. PATENT DOCUMENTS

| | | | |
|---|---|---|---|
| 3,820,016 A | | 6/1974 | Gieskieng |
| 4,407,072 A | | 10/1983 | Hoskins, Jr. |
| 4,798,963 A | | 1/1989 | Wittkopp et al. |
| 4,798,964 A | | 1/1989 | Schmalfuss et al. |
| 4,904,939 A | | 2/1990 | Mian |
| 4,932,784 A | | 6/1990 | Danneskiold-Samsoe |
| 5,193,120 A | * | 3/1993 | Gamache et al. ............ 382/286 |
| 5,247,338 A | | 9/1993 | Danneskiold-Samsoe et al. |
| 5,636,026 A | * | 6/1997 | Mian et al. .................. 356/602 |
| 5,793,492 A | * | 8/1998 | Vanaki ....................... 356/613 |
| 5,808,906 A | * | 9/1998 | Sanchez-Revuelta et al. .... 702/151 |
| 5,936,737 A | * | 8/1999 | Naumann .................... 356/613 |

FOREIGN PATENT DOCUMENTS

GB    2 183 840 A    6/1987

* cited by examiner

Primary Examiner—Russell Adams
Assistant Examiner—Magda Cruz
(74) Attorney, Agent, or Firm—John W. LaBatt; Hoffman, Warnick & D'Alessandro LLC

(57) ABSTRACT

The present invention provides a wheel measurement method and system to measure an attribute of a wheel. Light illumination devices and light sensing devices provide wheel data. A computer then performs a calculation on the wheel data to measure the attribute of the wheel.

50 Claims, 14 Drawing Sheets

US 6,768,551 B2

CONTACTLESS WHEEL MEASUREMENT SYSTEM AND METHOD

BACKGROUND OF THE INVENTION

1. Technical Field

The invention relates to a wheel measurement system and method, and more particularly, to a wheel measurement system that uses a plurality of paths of light to measure an attribute of a wheel.

2. Background Art

A railway wheel is subject to normal wear due in large part to friction contact between the wheel and the rail. As a railway wheel wears, the profile of the running surface and many critical dimensions of the wheel change due to dynamic interaction of the wheel with the rail. Such interaction is complex and many measurements have to be made to insure the wheel complies with the appropriate safety standards for continued operation. For example, the American Association of Railroads (AAR) provides the standards for rail operation within the United States.

Thus, there is a need to accurately measure several properties of a rail wheel, including, the rim thickness, the flange thickness, the flange height, the reference groove diameter (when available), the wheel diameter and the wheel angle of attack, to ensure that the wheel operation remains safe. These safety check measurements typically take place in train yards and in train shops. Before the train can leave the yard, all the wheels are visually inspected and a wheel with noticeable wear is measured to verify that the wheel is in good condition.

Similar measurements are used in recutting (wheel truing) the wheels to restore wheel profile as wheel wear exceeds certain permissible tolerances of flange height and flange thickness. This wheel truing operation takes place in train shops. In addition, wheel measurements are used by wheel manufacturers for production quality control of railway wheels as the wheels roll off a production line. Historically, these measurements have been manually taken using specialized mechanical calipers. One such widely used mechanical wheel gauge looks like an inverted "J". In use, the readings are taken and recorded by an operator directly off the mechanical gauge while the gauge is positioned against a wheel. There are several drawbacks, however, to such a mechanical gauge for the above-mentioned applications. In a situation where the wheel is installed on a train, for example, there are three major problems. First, the railway wheel has quite a few mechanical parts such as brakes, shock absorbers, axle support mechanisms and sand nozzles around it. Measurements have accordingly been difficult to take with the mechanical gauge because of the limited space around the wheel and because of the location of the flange on a railway wheel (towards the gage side of the track). Second, environmental conditions where the measurements are made are often poor. For example, dim light and limited ground clearance often makes this task extremely difficult to perform. Third, measuring a number of wheels can be laborious due to the lengthy steps required to take each measurement and the difficulty of reading the gauge.

Further, operator dependent recording of wheel measurement(s), and subsequent keypunch operations, make this important wheel wear monitoring process subject to manually induced errors. Measurement error can lead to three problems for the railroad. First, unacceptable wheels can remain in service providing an uncomfortable ride and posing a significant safety and liability hazard; second, wheels can be condemned which should be trued or reprofiled creating unnecessary expenses; and third, wheels which should be condemned are sometimes sent for truing, resulting in a disruption of the work flow in the wheel truing shop.

The mechanical gauge has been in use since 1923. Nevertheless, every year a number of train accidents are attributed to excessively worn wheels. Train maintenance staff measurement errors contribute to this safety risk. Several companies have invested heavily in computerized wheel management systems that are designed to automate the wheel maintenance process. However, the current mechanical gauge does not provide sufficiently accurate measurements to feed to such computerized wheel management systems. Furthermore, the wheel maintenance staff cannot restore a wheel to a prescribed profile when accurate wheel measurements are unavailable.

Several systems have been developed to automate the wheel measurement process. These attempts include handheld semi-automatic gaging systems and track mounted fully automatic gaging systems. Among the handheld gaging systems, one arrangement is featured in U.K. Patent Application No. GB 2183840A (granted Jun. 10, 1987 to Martti Kurkinan). This arrangement measures only rim profile using an electromechanical contact probe that travels across the rim. The measured profile is compared with a good reference profile gathered using a second probe.

Another handheld gage is described in U.S. Pat. No. 4,904,939 (granted Feb. 27, 1990 to Zahid Mian). This approach addresses the typical problems with handheld railway wheel profile measurement arrangements such as nonportability, elimination of transcription errors, and significant mechanical wear of the instrument. However, at least two difficulties remain. First, the wheel measurement process remains laborious when many wheels have to be measured quickly. Second, access to the mounted wheels remains difficult due to the presence of other mechanical parts, such as brake shoes, surrounding a mounted wheel.

Several other efforts have been made in the area of track mounted wheel measurement systems. For example, U.S. Pat. No. 3,820,016 (granted Jun. 25, 1974 to Marion Giesking) and U.S. Pat. No. 4,407,072 (granted Oct. 4, 1983 to Hoskins). Both of these arrangements utilize complicated electromechanical parts that come in contact with the wheel. Such mechanically complex arrangements present long term reliability problems, especially in outdoor environments, as well as mechanical wear and accuracy issues.

A contactless measurement method and apparatus is described in U.S. Pat. No. 4,798,963 (granted Jan. 17, 1989 to Wittkopp). This arrangement provides wheel diameter and profile measurement using multiple light sources and cameras. The apparatus employs complex mechanical operations to dispose the optical devices with respect to the wheels. The apparatus further requires extensive modifications to the rail in order to operate.

A similar arrangement is described in U.S. Pat. No. 4,798,964 (granted Jan. 17, 1989 to Schmalfuss). Based on optical measurement schemes, this arrangement uses multiple broad band light sources, a mechanical platform subject to wear, and complex optical configurations to measure wheel diameter and tread surface. Additionally, significant modifications are required to the rail for system operation. Unfortunately, this system is difficult to keep clean of dirt in the railway environment, provides questionable measurement accuracy, operates at very low speeds due to a complicated mechanical arrangement, is expensive to produce due to complex optical measuring schemes, requires significant installation space, and is not suitable for outdoor operation. A further shortcoming of this system is the critical use of a small number of data points from the tread surface of the wheel that are used to detect the wheel position and support diameter measurement. The tread surface is subject to the greatest wear and is subject to defects such as slid flats, spalling, and shelling that can cause serious errors using the measurement method described.

In another system described in U.S. Pat. No. 5,793,492 (granted Aug. 11, 1998 to Vanaki) optical devices are used to provide a series of two dimensional images of the wheel. While contactless and mechanically simple, the small number of data points used to develop some of the measurements (such as 4 points for diameter) render the system susceptible to measurement error due to wheel defects and buildup of materials such as grease and brake dust in critical measurement areas. A final shortcoming of this system is that some components of the system are as high as 2.7 inches above the top of the rail. Experience has shown that defective, worn, or broken equipment that is part of the underside of the train can come in contact with such a system and cause significant damage to precisely aligned optical components.

Other optical-based systems are described in U.S. Pat. No. 4,932,784 (granted Jun. 12, 1990 to Danneskiold-Samsoe) and U.S. Pat. No. 5,247,338 (granted Sep. 21, 1998 to Danneskiold-Samsoe et al.). These systems suffer similar shortcomings due to the small number of data points developed.

In view of the foregoing, there presently exists a genuine need for an electronic non-contact wheel measurement system capable of improving the integrity of the wheel measurement process by quickly measuring key wheel attributes irrespective of lateral and horizontal wheel movement and the size and location of isolated defects that may be present on a wheel.

SUMMARY OF THE INVENTION

The invention provides a system and method for illuminating a wheel and sensing a reflection to measure an attribute of the wheel.

A first aspect of the invention is directed to a method of measuring an attribute of a wheel having a first side and a second side, the method comprising the steps of: obtaining wheel data by: illuminating a first portion of the first side of the wheel with a first plurality of paths of light from a first light illumination device; and sensing wheel data based on a first reflection of the first plurality of paths of light from the wheel; and performing a calculation on the wheel data to measure the attribute of the wheel.

A second aspect of the invention is directed to a wheel measurement system for measuring an attribute of a wheel having a first side and a second side, the wheel measurement system comprising: a light measuring system for obtaining wheel data with light, the light measuring system including: a first light illumination device on the first side of the wheel for illuminating a first portion of the wheel with a first plurality of paths of light; and a first light sensing device for sensing a first reflection of the first plurality of paths of light from the wheel and generating the wheel data; and a control unit, in communication with the light measuring system, for measuring the attribute of the wheel from the wheel data.

A third aspect of the invention is directed to a wheel measurement system for measuring an attribute of a wheel having a first side and a second side, the wheel measurement system comprising: means for obtaining wheel data with light, the means for obtaining wheel data including: means for illuminating a first portion of the first side of the wheel with a first plurality of paths of light from a single light illumination device; and means for sensing wheel data based on a first reflection of the first plurality of paths of light from the wheel; and means for measuring an attribute of the wheel using the wheel data.

A fourth aspect of the invention is directed to a method of determining a start time for measuring an attribute of a wheel on a rail that supports the wheel with a measuring device, the method comprising the steps of: attaching a first magnetic sensor to the rail; attaching a second magnetic sensor to the rail wherein the second magnetic sensor is a known distance from the first magnetic sensor and a known distance from the measuring device; determining a first time that the wheel is detected by the first magnetic sensor; determining a second time that the wheel is detected by the second magnetic sensor; and calculating the start time for measuring using the first time, the second time and the known distance from the measuring device.

A fifth aspect of the invention is directed to a method of measuring an attribute of a wheel using a path of light, the method comprising the steps of: determining a brightness of the wheel; adjusting a brightness of a path of light based on the brightness of the wheel; illuminating a portion of the wheel with the path of light; sensing wheel data based on a reflection of the path of light from the wheel; and performing a calculation on the wheel data to measure the attribute of the wheel.

A sixth aspect of the invention is directed to a computer program product comprising a computer useable medium having computer readable program code embodied therein for measuring an attribute of a wheel, the program product comprising: program code configured to control a light illumination device for illuminating the wheel with a plurality of paths of light; program code configured to control a light sensing device that obtains wheel data based on a sensed reflection; and program code configured to perform a calculation on the wheel data to measure the attribute of the wheel.

The exemplary aspects of the present invention are designed to solve the problems herein described and other problems not discussed, which are discoverable by a skilled artisan.

BRIEF DESCRIPTION OF THE DRAWINGS

These and other features and advantages of this invention will be more readily understood from the following detailed description of the various aspects of the invention taken in conjunction with the accompanying drawings in which.

Figure 1A:
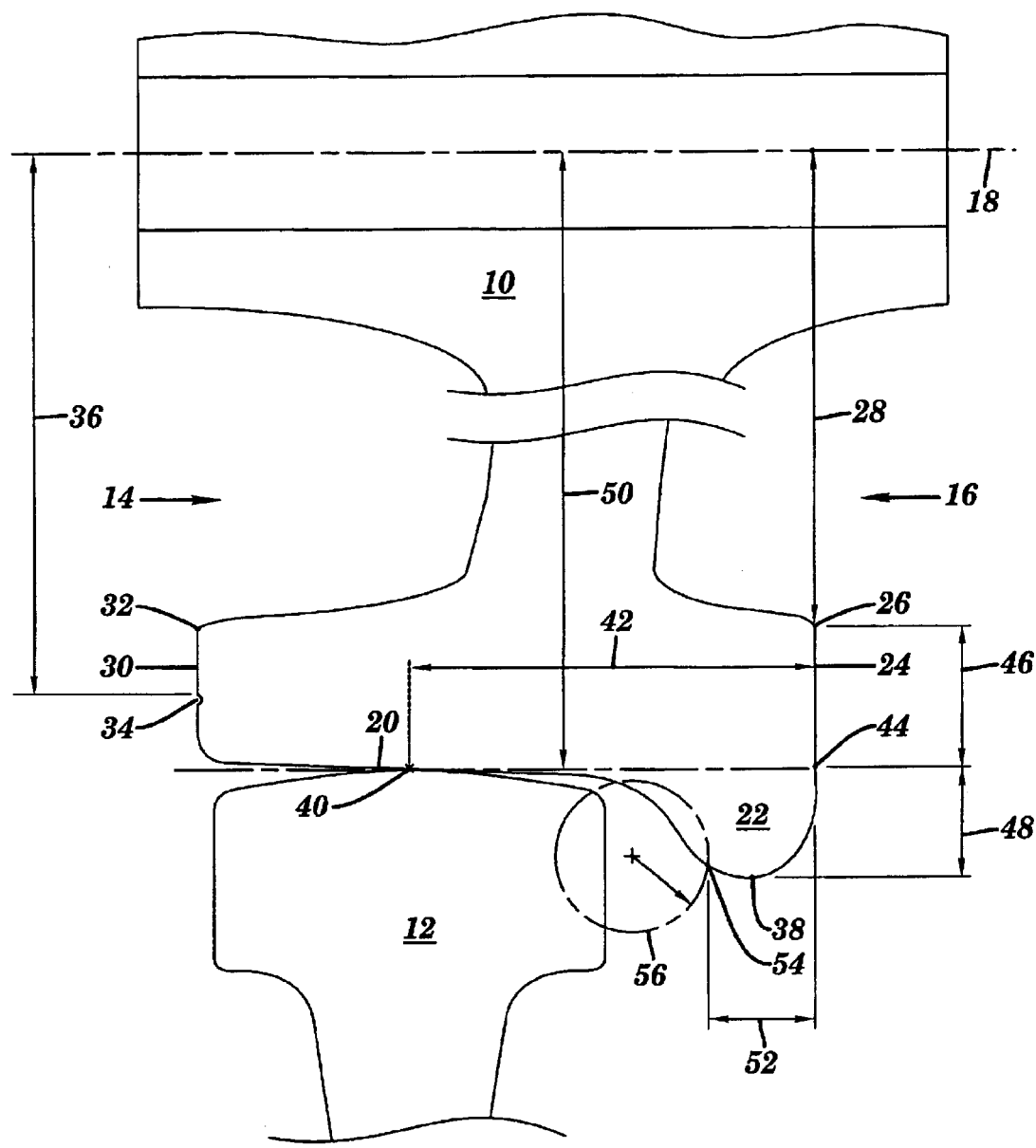
FIG. 1A depicts a partial cross-sectional view of a railway wheel on a track showing several measurement parameters.

It is noted that the drawings of the invention are not to scale. The drawings are intended to depict only typical embodiments of the invention, and therefore should not be considered as limiting the scope of the invention. In the drawings, like numbering represents like elements between the drawings.

DETAILED DESCRIPTION OF THE INVENTION

For convenience purposes only, the following outline is used in the description:
I. Overview
II. Railway Wheel Background
   A. Railway Wheel Measurements
   B. Railway Wheel Attributes
III. Wheel Measurement System
   A. Overview
   B. Environment Overview
     1. Light Measurement System Enclosure
     2. Environmental Control System
   C. Wheel Measurement System Schematic
   D. Light Measurement System
     1. Overview
     2. Light Illumination Device and Light Sensing Device
     3. Multiple Light Illumination Devices and Light Sensing Devices
     4. Operation
   E. Wheel Sensing System
     1. Wheel Presence System
     2. Wheel Brightness System
   F. Wheel Sensing and Light Measuring Method
   G. Wheel Attribute Measurement Method
IV. Alternatives

I. Overview

The invention provides a system and method of illuminating, sensing a reflection and measuring an attribute of a wheel. The wheel may remain in motion during measurement. The measurement of the attribute can then be used to determine whether the wheel is safe for operation.

One embodiment of the invention is presented in which the invention is used to measure various attributes of a railway wheel. The railway wheel may move at speeds up to about fifty miles per hour. The measuring system and method use a plurality of paths of light to illuminate a portion of the wheel whose reflections are subsequently sensed and stored as wheel data.

In one embodiment, the paths of light produce a plurality of substantially parallel lines of light that illuminate a portion of the wheel in a substantially radial direction. However, in other embodiments, the paths of light can produce other patterns of light on the portion of the wheel, for example, concentric circles, multiple points of light or multiple crosshair patterns. Various calculations are then performed on the wheel data to determine the various measurements of the attributes of the wheel. The system may use various sensors to sense the presence of a wheel, wheel speed and wheel brightness.

II. Railway Wheel Background

A. Railway Wheel Measurements

Figure 1B:
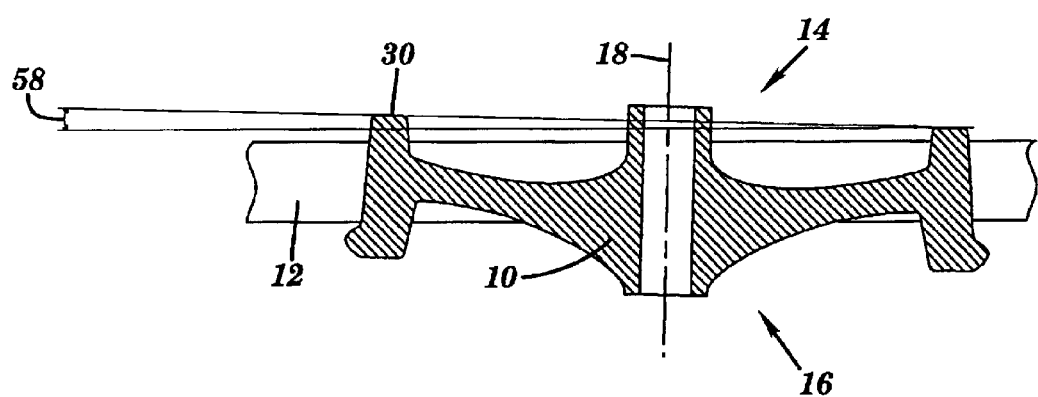
FIG. 1B depicts a cross-sectional top view of a railway wheel on a track showing additional measurement parameters.

Turning to FIGS. 1A and 1B, a typical railway wheel 10 capable of being sensed and measured by the system and method of the invention is shown. Wheel 10 may be utilized on locomotives, railroad cars, or any other vehicle that rides on rails. It should be recognized that other wheel types can be utilized on locomotives or railroad cars, and the teachings of the invention are not limited to sensing and measuring attributes of the particular wheel 10. In addition, the teachings of the invention may be applied to all types of wheels including non-rail wheels.

FIG. 1A depicts a partial cross-sectional view of two portions of wheel 10 supported by a rail 12 defined by a radial plane cutting through wheel 10. Wheel 10 includes a wheel centerline 18 about which wheel 10 rotates during normal operation. Wheel 10 contacts rail 12 along a tread surface 20. Wheel 10 further includes a flange 22 that prevents wheel 10 from leaving rail 12 due to outward forces present during normal operation. During normal operation, interactions between wheel 10 and rail 12 result in wear to tread surface 20 and flange 22.

Wheel 10 further includes a field side 14 and a gage side 16. When mounted in the standard manner on a two rail track, field side 14 faces outward from the rails. On field side 14 of wheel 10 is a field side rim face 30. The radially inboard extent of this surface is defined by a field side rim break 32. On some wheels, a reference grove 34 is present on field side rim face 30.

When mounted in the standard manner on a railroad car or locomotive, gage side 16 faces inward between the rails. Flange 22 is located on gage side 16 of wheel 10. Also on gage side 16 of wheel 10, is a gage side rim face 24. The radially inward extent of this surface is defined by a gage side rim break 26.

The point on flange 22 with the largest radial dimension is a flange peak 38. Tread surface 20 and flange 22 up to flange peak 38 form the running surface of the wheel and are collectively referred to as the wheel profile. A taping point 40 is defined as the point on tread surface 20 that is an axial distance known as a taping point offset 42 from gage side rim face 24. An axial line through taping point 40 will intersect gage side rim face 24 at a gage side gage point 44.

A flange gage point 54 is defined by the intersection of a gaging circle 56 with flange 22. Gaging circle 56 is defined by standard measurement devices, such as the AAR steel wheel gage. For example, for standard AAR 1B wheels, the radius of the gaging circle is 1.5 inches and the center is located 1.912 inches radially outward and 1.609 inches axially inward of taping point 40.

B. Railway Wheel Attributes

To permit a consistent determination of the serviceability and safety of wheel 10, standard measurements of tread surface 20 and flange 22 of wheel 10 have been defined. Under AAR standards, some measurements indicative of the serviceability of wheel 10 include: 1) reference groove circle radius 36 (when available), defined as the radial distance from reference groove 34 to wheel centerline 18, from which the reference groove diameter can be determined; 3) rim thickness 46, defined as the radial distance between taping point 40 and gage side rim break 26; 4) flange height 48, defined as the radial distance between flange peak 38 and gage side gage point 44; 5) wheel radius 50, defined as the radial distance between taping point 40 and wheel centerline 18, from which the wheel diameter can be determined; and 6) flange thickness 52, defined as the axial distance between gage side gage point 44 and flange gage point 54. FIG. 1B depicts a cross-sectional top view of wheel 10 supported by rail 12. Wheel 10 includes wheel centerline 18 about which wheel 10 rotates during normal operation. Wheel 10 further includes field side 14 and gage side 16 wherein field side 14 includes field side rim face 30. As shown in FIG. 1B, another measurement of wheel 10 attributes, a wheel angle of attack 58, is defined as the angle in a horizontal plane between field side rim face 30 and the longitudinal direction along rail 12.

III. Wheel Measurement System

A. Overview

The invention provides a system and method of measuring an attribute of a wheel by illuminating a portion of the wheel with a plurality of paths of light, sensing wheel data based on the reflection of the plurality of paths of light from the wheel and performing a calculation on the wheel data to measure the attribute of the wheel. The invention uses a light illumination device to illuminate a portion of the wheel with the plurality of paths of light, a light sensing device to sense the reflection of the plurality of paths of light from the wheel and a control unit to measure the attribute of the wheel.

The invention may include multiple light illumination devices and light sensing devices that illuminate and sense multiple portions of the wheel. Additionally, the invention may include the steps of first sensing the wheel and determining a start time for illuminating the wheel and/or sensing the reflection. The invention may also include measuring a brightness of the wheel and adjusting the brightness of a plurality of paths of light according to the measured brightness of the wheel. In measuring the attribute, the invention may include a method of removing bad data points from the wheel data.

B. Environment Overview

Figure 2:
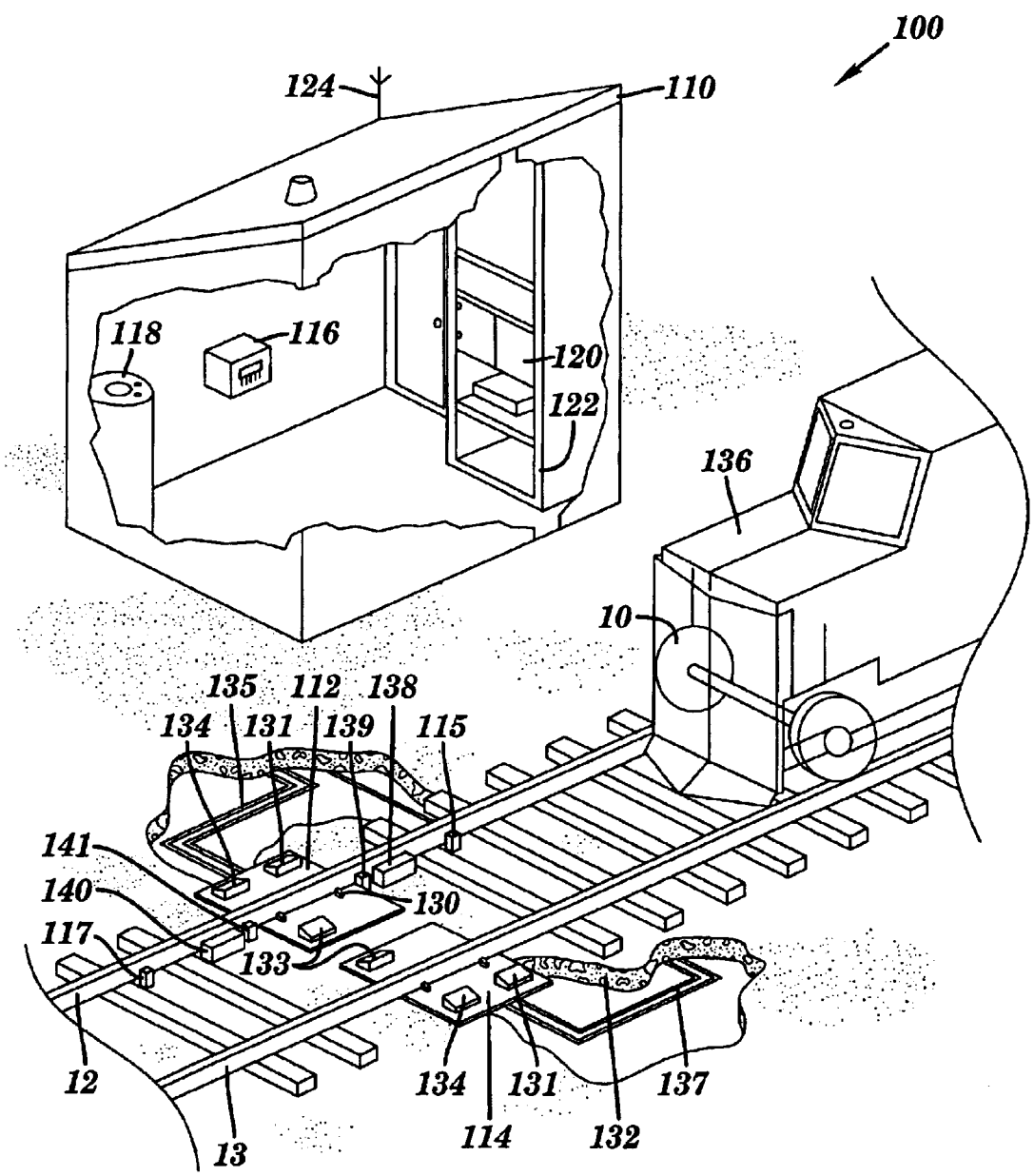
FIG. 2 depicts one environment for the invention.

Turning to FIG. 2, an exemplary environment for the system of the present invention is shown. The environment generally is of a rail side system 100 including a control enclosure 110; light measurement system enclosures 112, 114 that each house a light measuring system; proximity sensing devices 115, 117; wheel sensing devices 138, 140; and wheel brightness sensors 139, 141.

Control enclosure 110 can be a sealed insulated enclosure for environmental protection. Control enclosure 110 can incorporate a standard commercially available reversible air conditioning unit 116; industrial grade air-compressor (not shown) with a dry air supply tank 118; system control unit 120; and power conditioner 122. Other components known in the art can also be provided.

Air conditioning unit 116 is capable of maintaining the temperature within enclosure 110 within limits acceptable for proper operation of the electronics contained therein. Additionally, air conditioning unit 116 and enclosure 110 allow an individual to service the entire system comfortably under any weather conditions. Lightning arrester 124 is shown attached to enclosure 110 to protect enclosure 110, and the electronics therein, in environments where lightning strikes are possible.

The industrial grade air-compressor with a dry air supply tank 118 supplies clean air to the light measurement system enclosures 112, 114.

System control unit 120 is similar to any commercially available industrial computer. System control unit 120 includes software for providing control, data acquisition, measurement calculation and data storage functions of the current system, as described in more detail below. Air conditioning unit 116 allows use of an inexpensive system control unit 120 capable of working only in controlled environmental conditions.

Light measurement system enclosure 112 may be firmly attached to rail and light measurement system enclosure 114 maybe firmly attached to rail 13 using, for example, clamps 130. Additionally, light measurement system enclosures 112, 114 may be anchored to a location and not attached to rails 12, 13, respectively. Alternatively, a single light measurement system enclosure may be used to house all the electronics necessary for the two light measurement systems. Light measurement system enclosures 112, 114 are shown mounted below grade level in the ballast 132.

Each light measurement system enclosure 112, 114 includes domed assemblies 131, 133, 134 that protect the optical systems mounted inside (described in more detail below) from rain and other elements while allowing light to pass through. The optical systems within light measurement system enclosures 112, 114 are shown connected to system control unit 120 by wiring cables 135, 137.

While the current example uses wiring cables 135, 137 to connect system control unit 120 to the equipment within light measurement system enclosures 112, 114, it should be recognized that any method of communication can be used to allow system control unit 120 to communicate with the systems within the light measurement system enclosures 112, 114. Other forms of communication include fiber optic cables, radio modems, satellite signals, etc. Functionally equivalent systems are disposed on rails 12, 13. The discussion will use the system on rail 12 as exemplary of the two systems.

Proximity sensing devices 115, 117 detect a wheel 10 approaching the to system from either direction along rail 12. Wheel 10 may approach from either direction. As shown in FIG. 2, proximity sensing device 115 would detect wheel 10.

Once proximity sensing device 115 or 117 detects wheel 10 approaching, the wheel sensing system (discussed in more detail below) senses the position, speed and brightness of wheel 10. When it is determined that wheel 10 is in the correct position, the wheel measuring system (described in more detail below) within light measurement system enclosure 112 is triggered to obtain wheel data for wheel 10. The position and speed of wheel 10 can be used to determine the start time for the measurement. The brightness of wheel 10 can be used in the operation of the wheel measuring system. It should be noted, that for some applications, proximity sensing devices 115, 117 and wheel sensing devices 138, 140 may be sufficient for sensing wheels on all rails of a multiple rail track, for example, on both rails 12, 13.

1. Light Measurement System Enclosure

Figure 3:
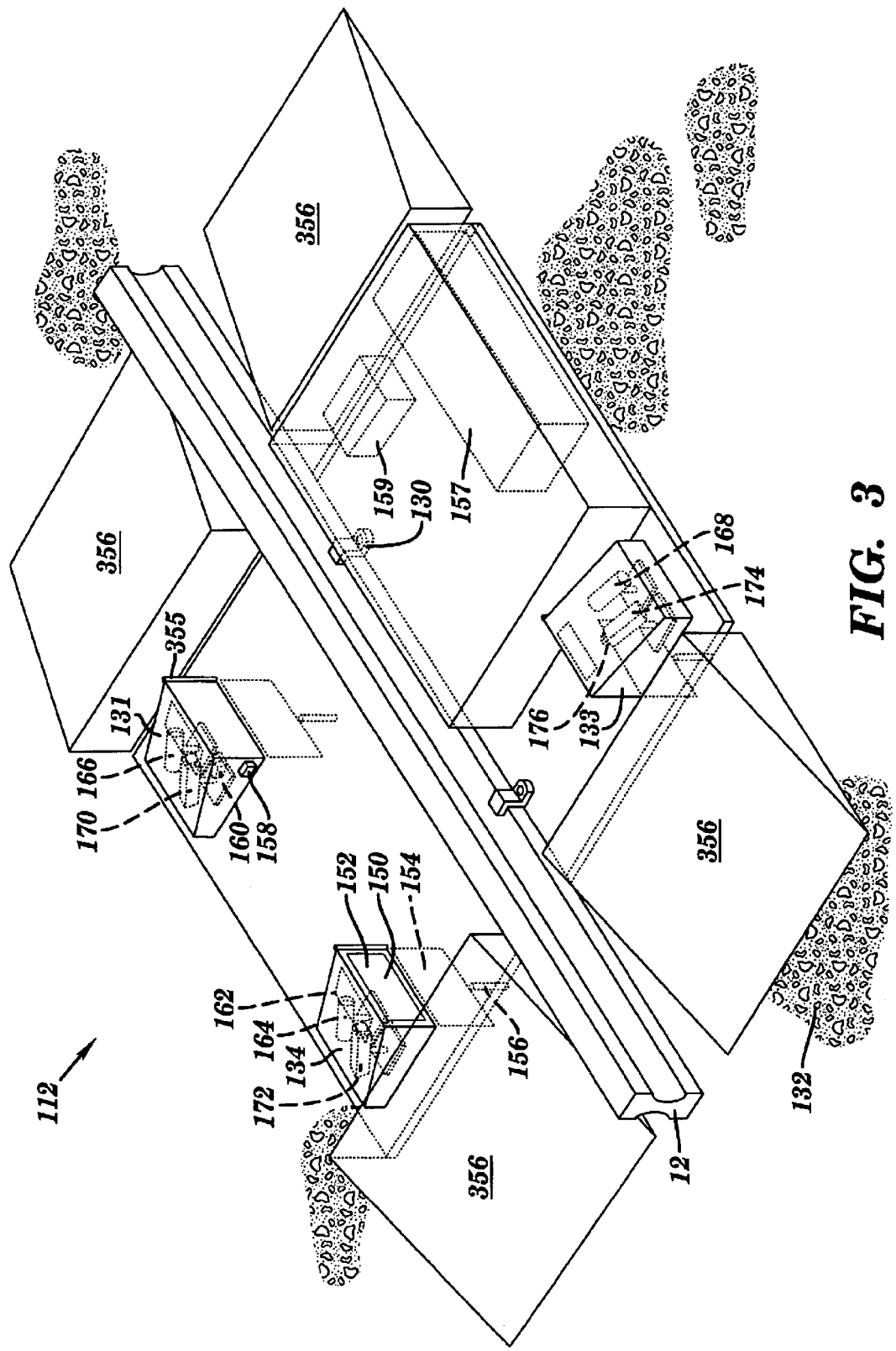
FIG. 3 depicts a detailed view of a light measurement system enclosure.

FIG. 3 provides a more detailed view of light measurement system enclosure 112 attached to rail 12. It should be noted that light measurement system enclosure 114 is functionally equivalent, and houses electronics that provide measurements for wheels on rail 13. Light measurement system enclosure 112 is shown disposed in ballast 132 below rail 12 and attached to rail 12 using clamps 130. The exemplary method of installing light measurement system enclosure 112 requires no modifications to rail 12.

Domed assemblies 131, 133, 134 protrude above ballast 132. Domed assemblies 131, 133, 134 prevent dust, rain and other contamination from entering enclosure 112. Using domed assembly 134 as the typical example, light measurement system enclosure 112 is situated so that a substantially vertical face 150 of domed assembly 134 is substantially parallel to and facing rail 12. Vertical face 150 has an optical window 152. Optical window 152 is a sufficient size and material to allow light to pass from within and outside light measurement system enclosure 112 without substantial reflection or other optical distortion. Optical window 152 can also comprise a material that filters light, allowing only limited wavelengths to pass through.

In some operating environments, contamination may potentially build up on optical window 152. To prevent such buildup, optical window 152 can be covered while the system is not in use. In one embodiment, shutter 154 can be moved upward to cover optical window 152 through the use of air solenoid 156. In one example, air solenoid 156 is in communication with local control unit 157 which determines when shutter 154 should be open or closed. In outdoor environments, air knives 355 may be provided to keep rain and the like from the windows during measurement operations.

Tapered panels 356 maybe installed on the leading and trailing edges of the light measurement enclosure 112 to prevent damage or change in alignment that might result from passage of a train with defective equipment, such as a dragging third rail shoe.

Figure 4:
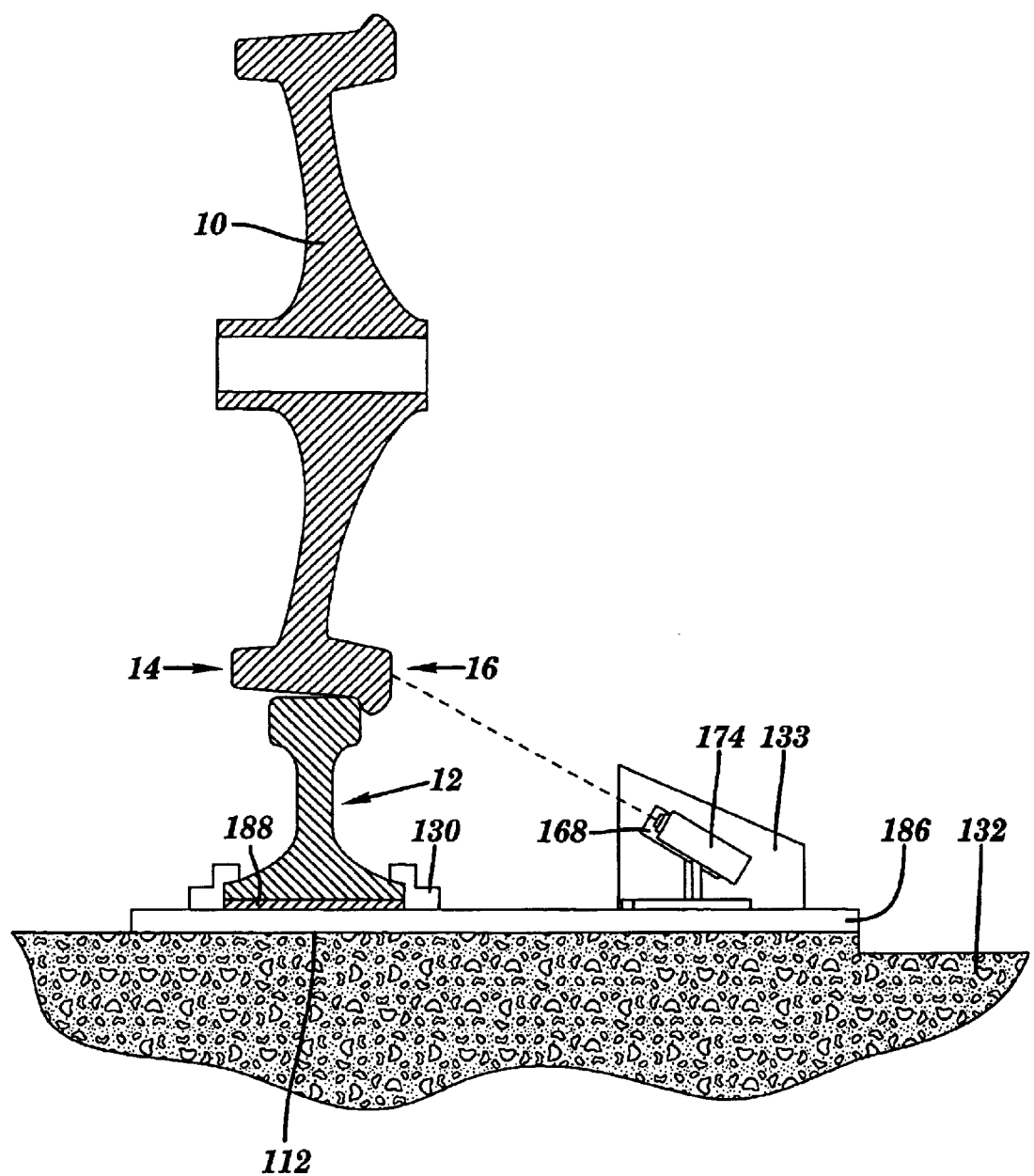
FIG. 4 depicts a cross-sectional front view of a light emitting device and light capturing device in operation.

As can be seen in FIG. 4, for example, light measurement system enclosure 112 has a lower surface comprising a stiff flat plate 186 that provides a geometrically stable mounting surface for the light illumination devices and light sensing devices therein. Plate 186 is shown attached to rail 12 by clamps 130. A compliant mounting block 188 is shown disposed between plate 186 and rail 12 to absorb shock and vibration generated by passing wheel 10. Mounting light measurement system enclosure 112 to rail 12 preserves the optical geometry of the optical elements in the face of changing environmental conditions such as sinking or shifting of the surrounding ballast 132 due to natural phenomena. Additionally no piece or part of light measurement system enclosure 112 is above a horizontal plane extending from the top of rail 12.

2. Environmental Control System

Returning to FIG. 3, as an example, an environmental control system is shown within light measurement system enclosure 112 to maintain conditions for optimal use of the electronics. The environmental control system allows operation in many environmental conditions. The environmental control system may not be necessary for operation under certain conditions, for example, warm weather climates or indoor operation.

Within light measurement system enclosure 112 is environmental control unit 159. Briefly turning to domed assembly 131 as an example, temperature and humidity sensors 158, 160 are provided outside and inside light measurement system enclosure 112, respectively. Temperature and humidity sensors 158, 160 are located near optical window 152. Temperature and humidity sensors 158, 160 provide electrical signals that are used by environmental control unit 159 to operate heater 162 (as numbered on domed assembly 134) for the purpose of keeping optical windows 152 and other optical elements within light measurement system enclosure 112 free from ice and condensation.

C. Wheel Measurement System Schematic

Figure 5:
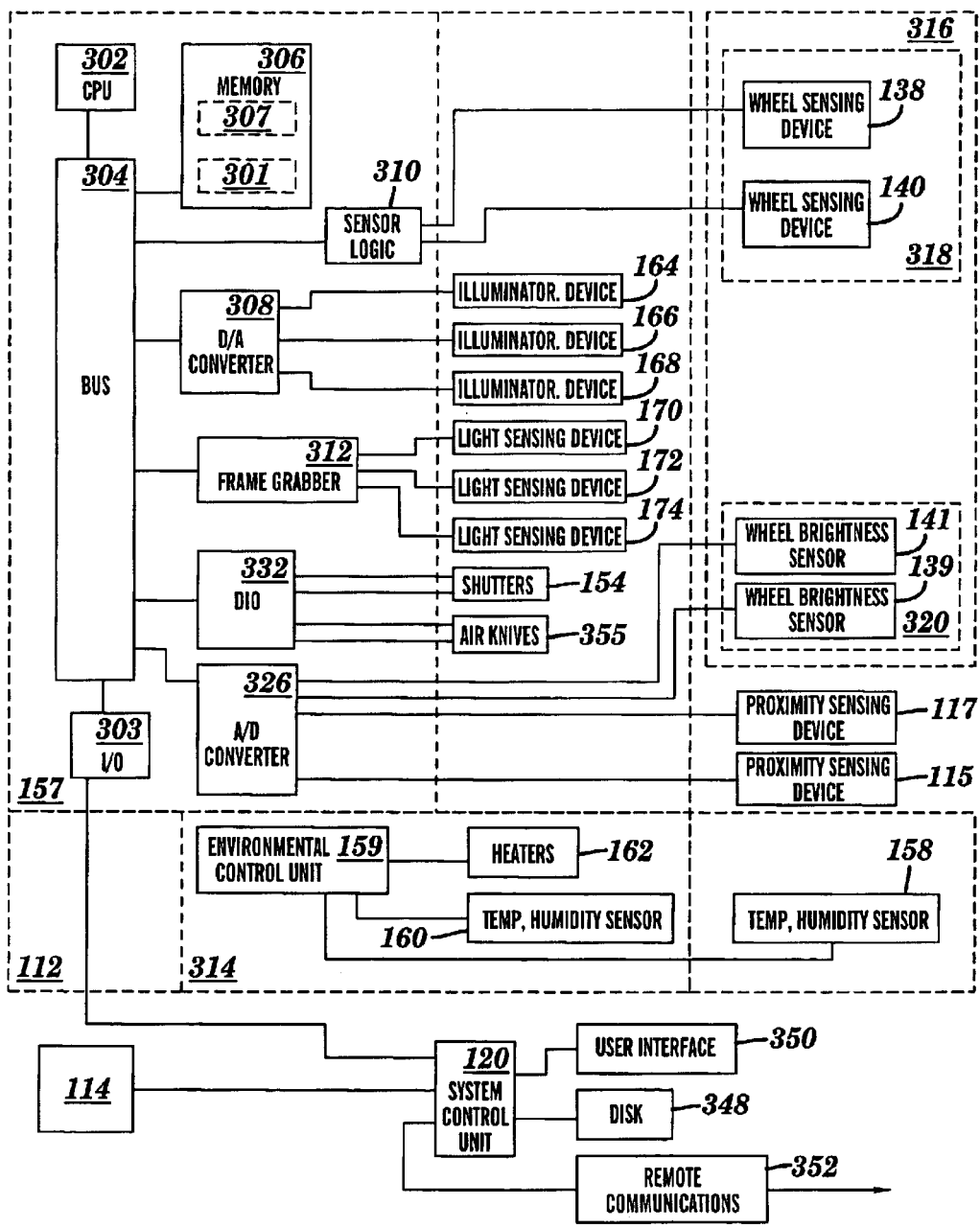
FIG. 5 depicts a schematic representation of one embodiment of the wheel measurement system.

Turning to FIG. 5, a schematic of one embodiment of the wheel measurement system of the invention is shown. One embodiment of the invention includes: a light illumination device 164, a light sensing device 170 and a control unit. As shown in FIG. 5, however, multiple light illumination devices 164, 166, 168 and light sensing devices 170, 172, 174 can be used. FIG. 5 also shows a local control unit 157 for communicating with the various sensors and a system control unit 120 for performing calculations and a user interface as used in one embodiment of the invention. Additional sensing devices are shown in FIG. 5 that provide further functionality for one embodiment of the invention as discussed below.

FIG. 5 shows light measurement system enclosures 112, 114. Each light measurement system enclosure includes substantially the same parts, however only the details of enclosure 112 are presented and discussed herein. In particular, each includes a local control unit 157, an environmental control unit 159 and various sensors. Other sensors are shown external to light measurement system enclosure 112.

Local control unit 157 preferably includes a memory 306, a central processing unit (CPU) 302, input/output devices (I/O) 303 and a bus 304. Memory 306 preferably includes a program product 307 that, when executed by CPU 302, implements various features of the invention, and wheel data 301 collected from the corresponding measuring devices. A database may also be provided for storage of data relative to processing tasks.

Memory 306 may comprise any known type of data storage system and/or transmission media, including magnetic media, optical media, random access memory (RAM), read only memory (ROM), a data object, etc. Moreover, memory 306 may reside at a single physical location comprising one or more types of data storage, or be distributed across a plurality of physical systems. CPU 302 may likewise comprise a single processing unit, or a plurality of processing units distributed across one or more locations.

I/O 303 may comprise any known type of input/output device including a network system, modem, keyboard, mouse, scanner, voice recognition system, CRT, printer, disc drives, etc. Additional components, such as cache memory, communication systems, system software, etc., may also be incorporated into local control unit 157.

Using light measurement system enclosure 112, for example, local control unit 157 communicates with system control unit 120. Upon a determination that all wheels have passed light measurement system enclosure 112, wheel data 301 is transferred from local control unit 157 to system control unit 120. System control unit 120 stores wheel data 301, for example, on a disk 348. System control unit 120 can then perform one or more calculations on wheel data 301 to measure one or more attributes of a wheel or wheels.

System control unit 120 also may provide a user interface 350 to access, display and print wheel data 301. Additionally, system control unit 120 can provide a remote communications link 352 to transfer wheel data 301 or wheel attibute(s) to another computer. Various remote communications links are possible with the invention, including a local area network (LAN), a wide area network (WAN), an Internet connection, a radio modem, or a satellite link.

A digital to analog converter 308 is shown attached to bus 304, is in communications with CPU 302, and provides the interface to control light illumination devices 164, 166, 168. A frame grabber 312 is shown attached to bus 304 and acquires reflected light data (wheel data 301) from light sensing devices 170, 172, 174 that is subsequently stored in memory 306. Sensor logic 310 provides the interface for wheel sensing devices 138, 140. Analog to digital (A/D) converter 326 acquires analog signals from proximity sensing devices 115, 117 and wheel brightness sensors 139, 141. Digital I/O 332 provides the interface to control shutters 154 and air knives 355.

Program product 307, executing on CPU 302 uses the data from the various input devices to appropriately control the various output devices to implement the invention.

FIG. 5 also shows a schematic of an environmental control system 314. Environmental control system 314 prevents condensation on the optical elements in the system during operation. Temperature and humidity sensors 158, 160 are located outside and inside light measurement system enclosure 112, respectively. Environmental control unit 159 activates or deactivates heater 162 based on the input from the temperature and humidity sensors 158, 160.

All of the functions of FIG. 5 can be implemented in hardware, software or a combination of hardware and software. D/A converter 308, sensor logic 310, frame grabber 312, A/D converter 326, and digital I/O converter 332 are exemplary of the types of interfaces required for communicating with I/O devices. These converters maybe included as part of local control unit 157, as part of the I/O device, or any combination thereof. Additionally, the various I/O devices may require different converters for communications.

While system control unit 120, local control unit 157 and environmental control unit 159 are shown as separate units, it should be recognized that the functions of these units could all be placed in a single control unit or any number of control units. For example, system control unit 120 could contain the various aspects of local control unit 157 and implement all the functions of local control unit 157 and environmental control unit 159 as well as the functionality currently provided therein. Alternatively, local control unit 157 could implement all the functions of environmental control unit 159 while the functionality of system control unit 120 remains separate.

Additionally, the discussion uses the same number of light illumination devices 164, 166, 168 as light sensing devices 170, 172, 174. However, it should be recognized that a single light sensing device may sense light reflections from multiple light illumination devices. Likewise, multiple light sensing devices may sense light reflections from a single light illumination device.

D. Light Measurement System

1. Overview

As seen in FIGS. 2 and 4, for example, the light measurement system includes a light illumination device 168, a light sensing device 174 and a control unit, for example, system control unit 120. Light illumination device 168 is situated to project a plurality of paths of light to illuminate a portion of wheel 10. In one embodiment, the plurality of paths of light produce a plurality of lines of light that are oriented so that the central line crosses the rim face of the wheel in an approximately radial direction. The plurality of lines of light illuminate an area with a width of about 4 inches. At a 16 inch standoff of the illuminator, this defines an arc of approximately 13 degrees on the wheel. The plurality of lines of light reflect off wheel 10 and are sensed by light sensing device 174 and stored as wheel data. System control unit 120 uses the wheel data to measure an attribute of wheel 10.

2. Light Illumination Device and Light Sensing Device

FIG. 4 provides a cross-sectional front view of light measurement system enclosure 112, rail 12, and wheel 10 when wheel 10 is in an optimum measurement position. In FIG. 4, light illumination device 168 projects light onto a gage side 16 of wheel 10. Light reflected off wheel 10 is sensed by light sensing device 174.

Figure 6:
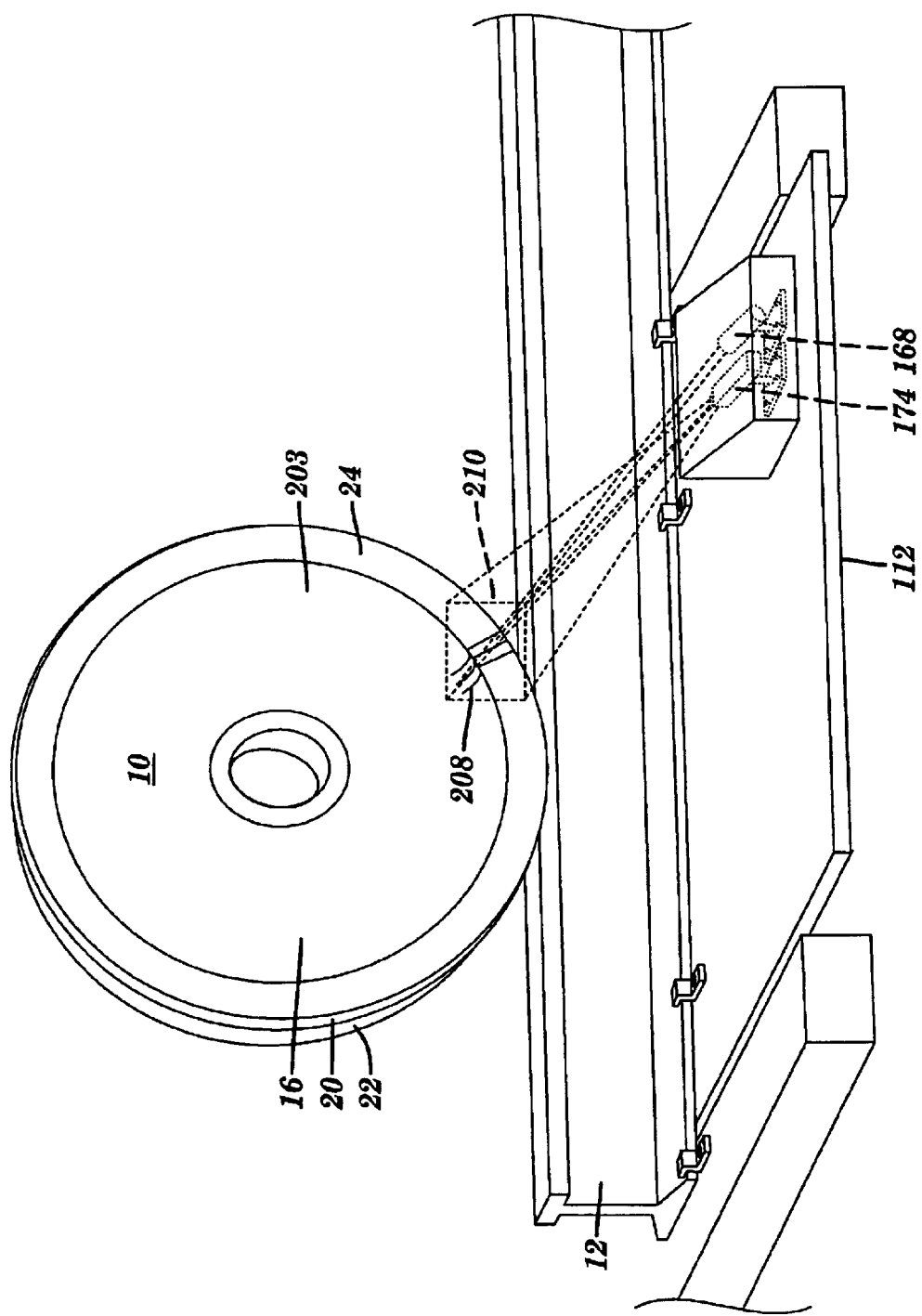
FIG. 6 depicts the gage side measurement of a wheel according to one embodiment of the invention.

FIG. 6 shows the illumination and imaging geometry of gage side 16 of wheel 10 when it is in an optimal measurement position. Light illumination device 168 projects multiple lines of light 208 onto wheel 10 so that a region including portions of a hub 203, gage side rim face 24, and the gage side of flange 22 are illuminated. Light reflected from the surface of wheel 10 is sensed by light sensing device 174. For one embodiment, the approximate boundary of the image obtained by light sensing device 174 is shown by outline 210.

Figure 7:
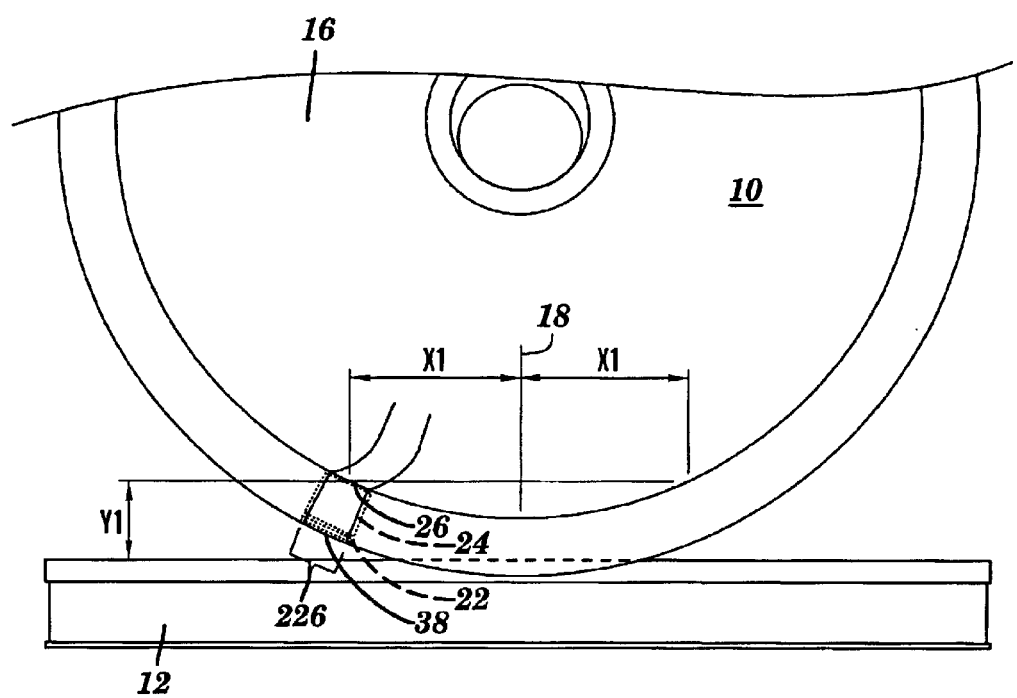
FIG. 7 depicts a more detailed view of the gage side measurement of a wheel according to one embodiment of the invention.

FIG. 7 further depicts the region on gage side 16 of wheel 10 that is illuminated by light from light illumination device 168 as shown in FIG. 6. Coordinate system 211 is shown in which the X axis is parallel to the down rail direction, the Y axis is vertical and the Z axis is the cross rail direction. As shown in FIGS. 6 and 7, region 226 is illuminated by light illumination device 168 and the light reflection is sensed by light sensing device 174 on gage side 16 of wheel 10. The center of region 226 is located at a distance X1 from wheel centerline 18 and a distance Y1 above the top of rail 12. Measurement points on gage side 16 of wheel 10 include flange 22, gage side rim face 24 and gage side rim break 26, and the flange peak 38.

3. Multiple Light Illumination Devices and Light Sensing Devices

According to one embodiment of the invention, multiple light illumination devices and light sensing devices can be used.

For example, returning to FIG. 3, within light measurement system enclosure 112, light illumination devices 164, 166, 168; light sensing devices 170, 172, 174; and local control unit 157 are present. Using light illumination device 168 and light sensing device 174 as a typical example, light illumination device 168 is situated to pass light through optical window 152 toward rail 12. When in operation, the light reflects off a wheel situated on rail 12 and a portion of the light returns through optical window 152 and is sensed by light sensing device 174. Light sensing device 174 can be fitted with a filter 176 that only allows light wavelengths corresponding to those emitted by light illumination device 168. Use of filter 176 substantially reduces the amount of light that reaches light sensing device 174 from other light sources, thereby increasing the accuracy of the measurement.

Figure 8:
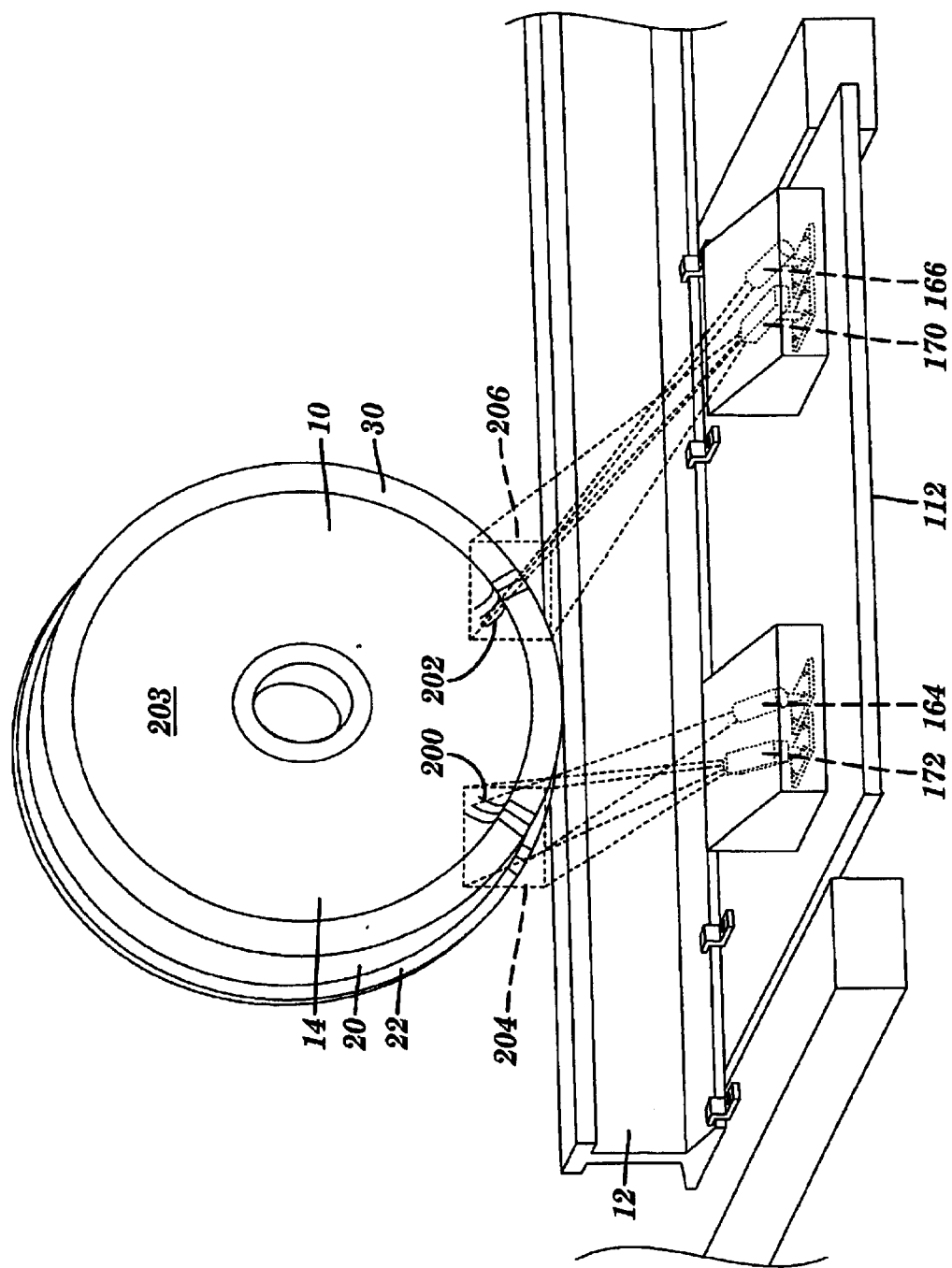
FIG. 8 depicts the field side measurement of a wheel according to one embodiment of the invention.

FIG. 8 shows the illumination and imaging geometry of field side 14 of wheel 10 when it is in an optimal measurement position. Light illumination devices 164, 166 each project multiple lines of light 200, 202 onto wheel 10 so that a region including portions of a hub 203, field side rim face 30, tread surface 20 and flange 22 are illuminated. Light reflected from the surface of wheel 10 is sensed by light sensing devices 170, 172. For one embodiment, the approximate boundaries of the images obtained by light sensing devices 170, 172 are shown by outlines 204, 206, respectively.

Figure 9:
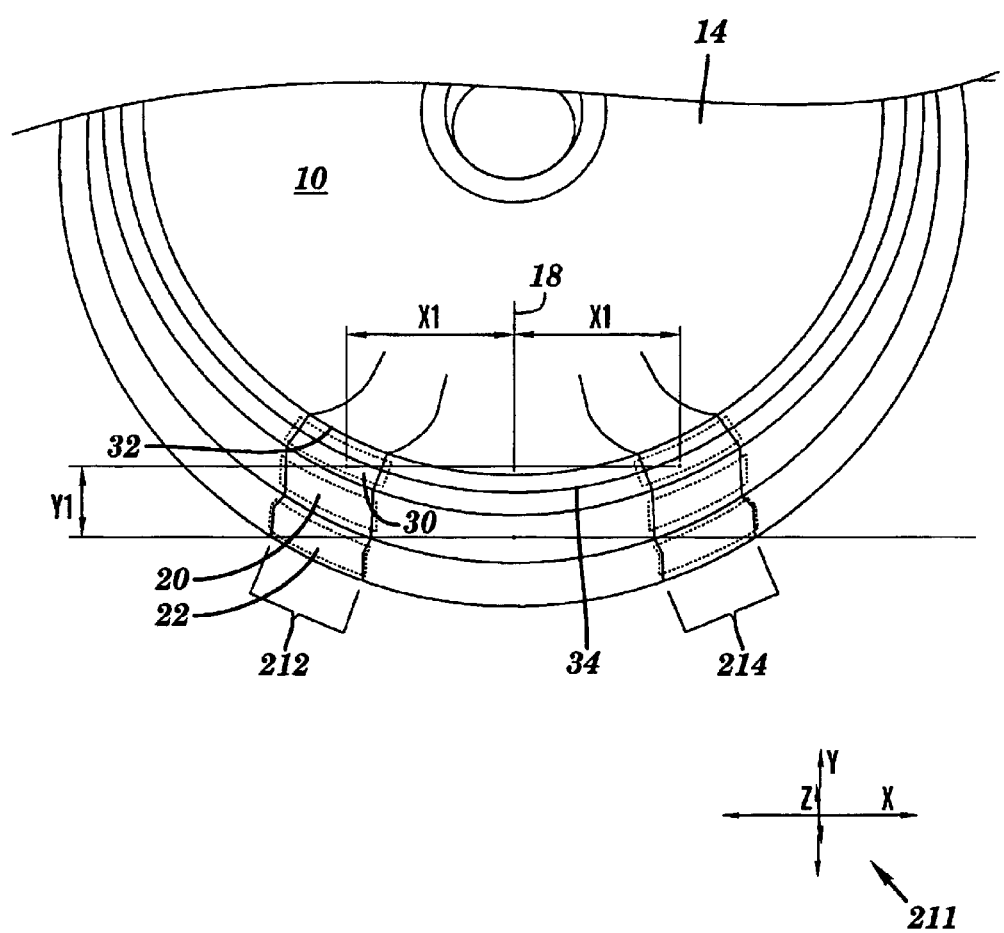
FIG. 9 depicts a more detailed view of the field side measurement of a wheel according to one embodiment of the invention.

FIG. 9 further depicts the regions of light on field side 14 of wheel 10 that are illuminated by light from light illumination devices 164, 166 as shown in FIG. 8. Coordinate system 211 is shown in which the X axis is parallel to the down rail direction, the Y axis is vertical and the Z axis is the cross rail direction. Referring to both FIGS. 8 and 9, regions 212, 214 are illuminated by light illumination devices 164, 166 and the light reflections are sensed by light sensing devices 170, 172 on field side 14 of wheel 10. The centers of regions 212, 214 are located at a distance X1 from wheel centerline 18 and a distance Y1 above the top of rail 12. Measurement points on field side 14 of wheel 10 include field side rim break 32, field side rim face 30, reference groove 34 (for some wheels), tread surface 20 and flange 22.

4. Operation

The elevational and azimuthal angles of each light illumination device used in the invention is chosen to position the illumination pattern on a wheel at a location not obstructed by hardware such as brake shoes or sand nozzles or a rail. The elevation and azimuth angles of each light sensing device is chosen to position the center of the sensed area at the center of the illumination pattern. Each light sensing device azimuth angle is further chosen to be different enough from the illumination angle to provide sufficient resolution for the light measuring method.

As shown in FIG. 3, light illumination devices 164, 166, 168 can be, for example, sources of laser light that are projected as multiple diverging lines of light. In one embodiment, light illumination devices 164, 166, 168 project multiple substantially parallel lines. The lines of light are oriented so that the central line crosses the appropriate rim face in an substantially radial direction.

In one embodiment, light illumination devices 164, 166, 168 each project at least nineteen parallel lines of light onto a wheel. The lines are projected so that the illuminated lines on the wheel are each roughly a quarter inch apart. Based on a statistical analysis of a sampling of railway wheels, this quantity of data allows the system to remove and ignore substantially all wheel defects (such as nicks, buildup, spalls, etc.) from the wheel data while retaining sufficient wheel data to obtain quality measurements. In some applications of the invention, dependent upon the required accuracy of measurement, light illumination devices 164, 166, 168 may project more or less parallel lines of light onto a wheel. Nineteen lines were selected due to the ready availability of light illumination devices that project this quantity, and the large amount of data provided.

Light illumination devices 164, 166, 168 are commercially available or can be easily constructed. It should be noted that the use of other light illumination devices now known or later developed are within the scope of the present invention. Such light illumination devices may employ other wavelength illumination or other structured light projection patterns (such as cross hairs, grids of dots, etc).

Light sensing devices 170, 172, 174 can be any light sensing devices now known or later developed. For example, charge coupled device cameras containing high speed electronic shutters capable of being triggered by an external electrical signal and sensitive to the wavelengths of light emitted by light illumination devices 164, 166, 168 maybe selected. Selective wavelength sensitivity can be obtained by the spectral response of the charge coupled device in the camera and/or the use of filter 176 external to the camera.

Distances X1 and Y1 shown on FIGS. 7 and 9 are chosen to eliminate interference from ancillary hardware that may be present such as brake pads and sand nozzles. Distances X1 and Y1 are also chosen to image the correct regions 212, 214, 226 of wheel 10. For example, for U.S. standard AAR wheels, distance X1 is preferentially 9 inches and distance Y1 is preferentially 6 inches. This corresponds to wheel 10 with a diameter in the range of 32 to 46 inches.

E. Wheel Sensing System

1. Wheel Presence System

Referring to FIG. 5, a wheel sensing system 316 having a wheel presence system 318 can be included in the invention to detect the presence of a wheel and determining a start time for obtaining wheel data. In one embodiment, wheel presence system 318 includes a wheel sensing device 140 placed near a path of the wheel to sense the wheel. Based on the data from wheel sensing device 140, a start time for obtaining wheel data is calculated.

Figure 10:
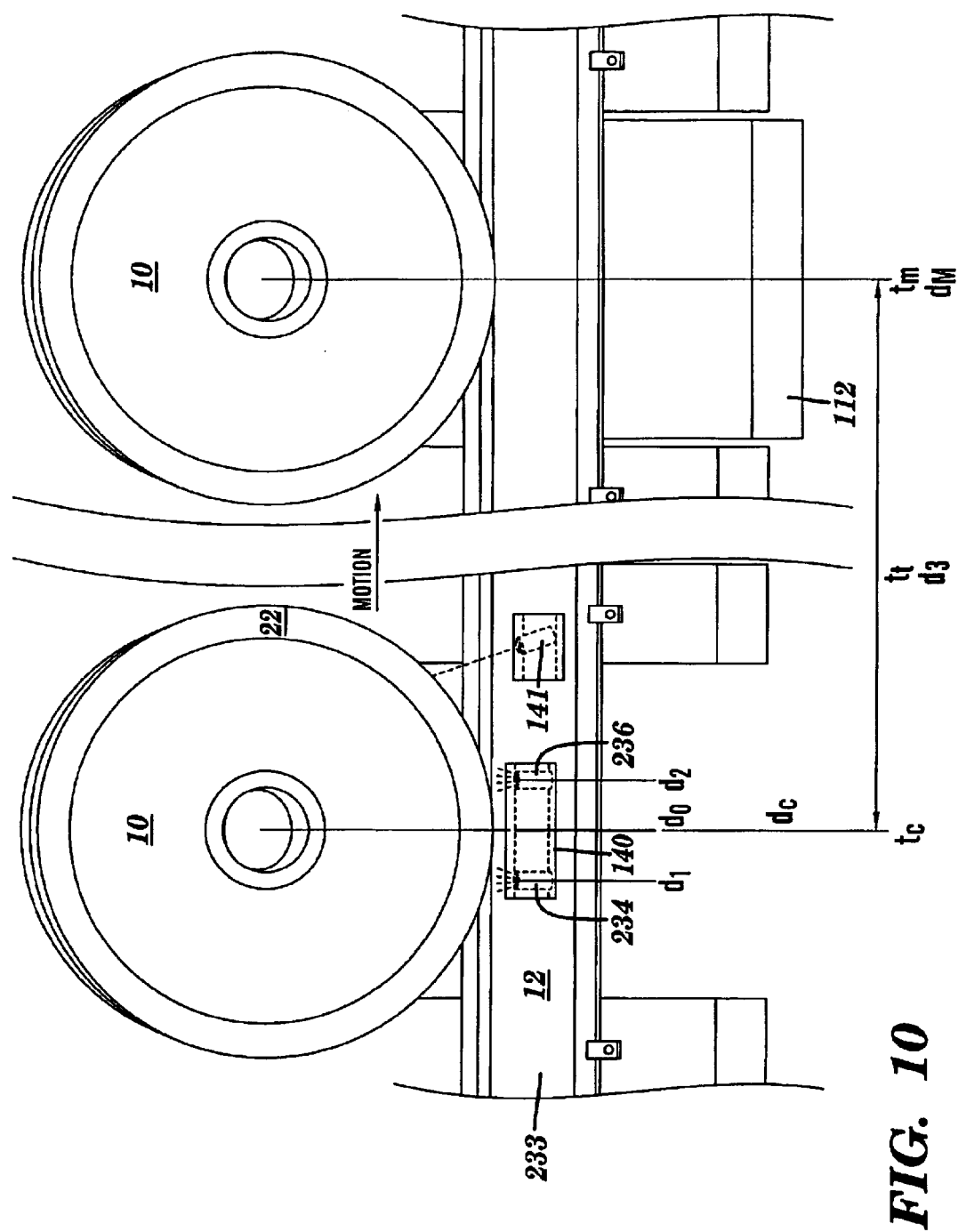
FIG. 10 depicts a perspective view of a wheel supported by a rail and an exemplary embodiment of the wheel sensing system.

FIG. 10 is a perspective view showing wheel 10 supported by rail 12 in two locations. Wheel 10 is moving in the direction indicated by the motion arrow. Wheel sensing device 140 is shown alongside light measurement system enclosure 112. In one embodiment, wheel sensing device 140 includes a pair of sensors 234, 236. Wheel sensing device 140 is shown mounted to a gage side web 233 of rail 12 and aligned so that flange 22 of wheel 10 will be detected as it passes over sensors 234, 236.

Wheel sensing device 140 is placed a known distance from wheel measurement enclosure 112 ($d_3$). Additionally, sensors 234, 236 are set a known distance apart ($d_2-d_1$). The closer wheel sensing device 140 is placed to wheel measurement enclosure 112, the less error is introduced into the system due to accelerations or decelerations of wheel 10 in the intervening distance.

In one embodiment, sensors 234, 236 detect the presence of metallic material. For example, sensors 234, 236 can be standard wheel sensors of the type manufactured by Tiefenbach Gmbh and used in the industry for signaling operations.

Turning briefly to FIG. 5, wheel sensing device 140 can communicate with local control unit 157 through sensor logic 310, for example. Local control unit 157 records the output of wheel sensing device 140, including the outputs of sensors 234, 236. This data is subsequently used in timing the operation of the light measurement system.

Figure 11:
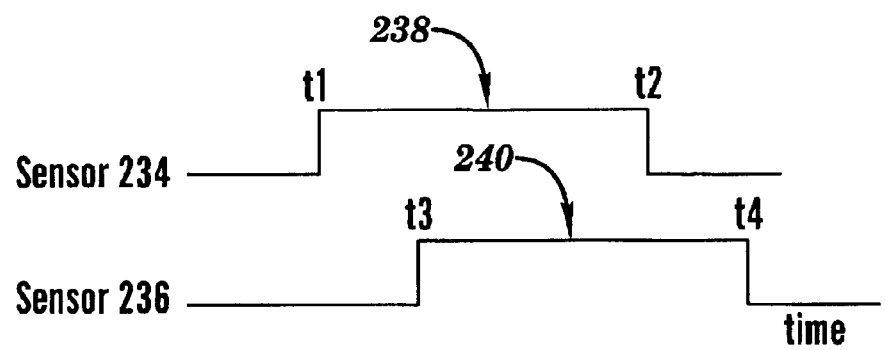
FIG. 11 depicts a timing table used in determining the speed and center of a wheel in one embodiment of the wheel sensing system.

FIG. 11 shows a timing table generated by the system shown in FIG. 10, that can be used in determining the speed and center of wheel 10 for one embodiment. The output of sensors 234, 236 are shown as wheel 10 passes over each. The signals from sensors 234, 236 are proportional to the amount of metallic material within the range of the sensor. The outputs from sensors 234, 236 are converted into binary electrical pulse trains by thresholding and timing circuits known by those in the art.

Time $t_1$ represents the time that wheel 10 enters the range of sensor 234. Similarly, time $t_3$ represents the time that wheel 10 enters the range of sensor 236. Wheel 10 moves out of the range of sensors 234, 236 at times $t_2$, $t_4$ respectively. The output of sensor 234 remains high for period 238 ($t_2-t_1$). Likewise, the output of sensor 236 remains high for period 240 ($t_4-t_3$). Periods 238, 240 depend upon the diameter, flange height, position and orientation of wheel 10 on rail 12.

From symmetry, it can be shown that the position, $d_c$ shown in FIG. 10, of the center of wheel 10 is midway between sensors 234, 236 at a time $t_c$ that is midway between times t1 and t4. Therefore, time $t_c=t_1+(t_4-t_1)/2$. The speed of wheel 10, v, can be calculated by either: $v=(d_2-d_1)/(t_3-t_1)$ or $v=(d_2-d_1)/(t_4-t_2)$.

The desired position of wheel centerline 18 for optimum measurement is shown as $d_m$ in FIG. 10. Position $d_m$ is a known distance, $d_3$, from $d_c$, the center of wheel sensing device 140. A start time $t_m$ at which wheel centerline 18 is at location $d_m$ can be determined by: $t_m=t_c+t_r$, where $t_r$ is calculated by: $t_r=d_3/v-(t_4-t_1)/2$.

This result is independent of the diameter, flange height, and position on rail 12 of wheel 10. Further, if $d_3$ is small, for example five feet, the result is not significantly influenced by any acceleration or deceleration that wheel 10 is likely to encounter during the interval $t_r$.

2. Wheel Brightness System

The wheel sensing system 316 of FIG. 5 may include a wheel brightness system 320 for determining a brightness of the wheel. The brightness of the wheel is then used to adjust the brightness of a path of light from a light illumination device.

FIG. 10 shows one embodiment, in which wheel brightness sensor 141 is shown mounted to a gage side web 233 of rail 12 and alongside light measurement system enclosure 112. As shown in FIG. 5, a wheel brightness sensor 141 of wheel brightness system 320 can communicate with local control unit 157 through A/D converter 326, for example. Based upon the data from wheel brightness sensor 141, local control unit 157 determines an appropriate brightness for all or a portion of light illumination devices 164, 166, 168.

While shown in conjunction with light illumination devices that illuminate a portion of a wheel with a plurality of paths of light, the principle of sensing a brightness of the wheel and adjusting the brightness of a light illumination device applies equally for light illumination devices that illuminate a portion of a wheel with a single path of light.

Depending on the application, a single wheel brightness sensor can be used to adjust multiple light illumination devices or a single light illumination device. For example, a wheel brightness sensor may adjust the brightness of light illumination device(s) on the same side of a wheel, while the brightness of light illumination device(s) on the other side of the wheel remains set or is controlled by a second wheel brightness sensor.

F. Wheel Sensing and Light Measuring Method

Figure 12:
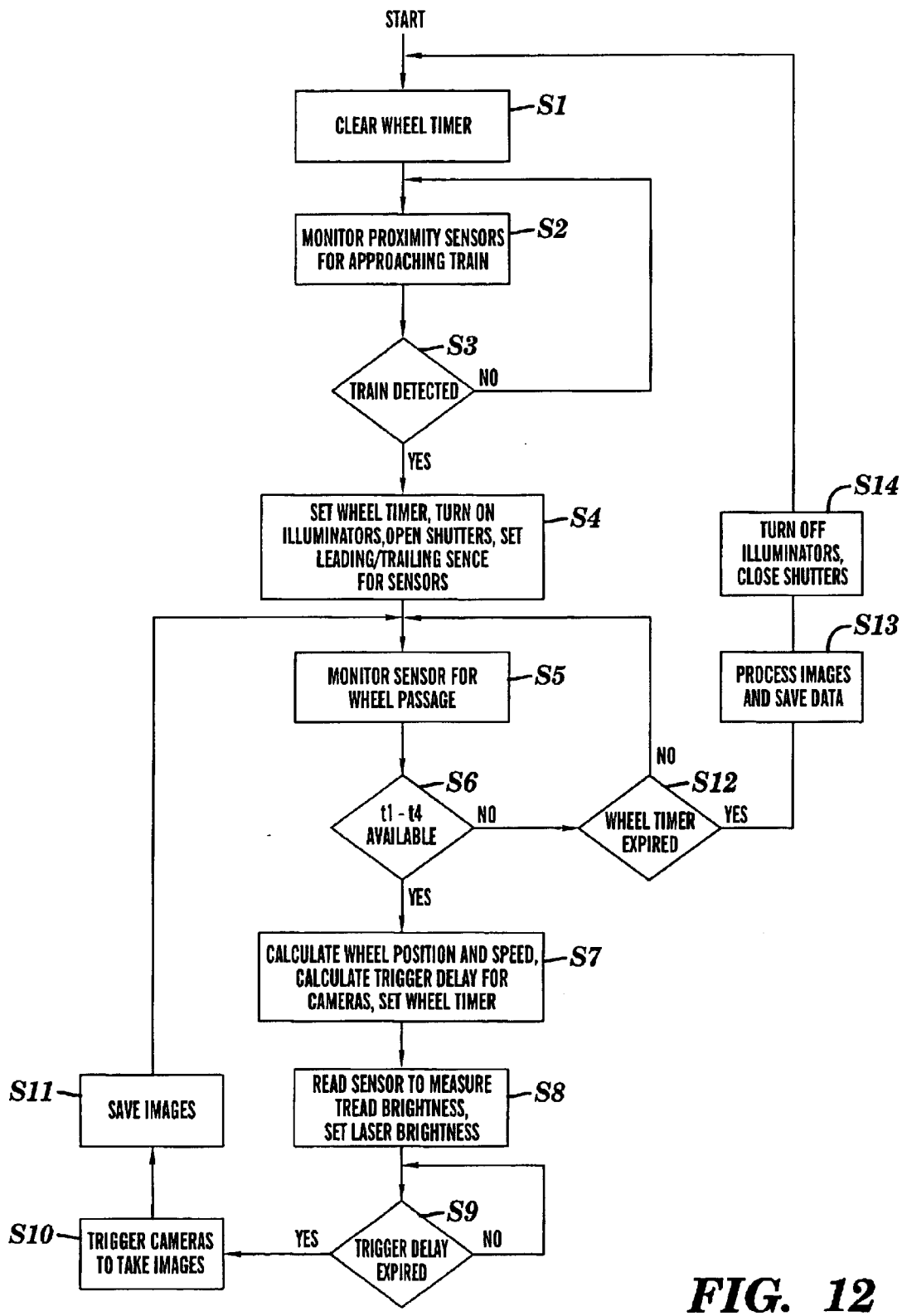
FIG. 12 is a flowchart of a method of sensing and measuring wheels according to one embodiment of the invention.

FIG. 12 illustrates the method of sensing and measuring wheels according to one embodiment of the invention. Initially, a wheel timer is cleared in step S1. Wheel timer is used to determine when a series of wheels is complete. Each time a wheel passes through the system the timer is again reset. When all wheels 10 on the train have passed through the system, the timer expires, signaling the end of the measurement process.

In steps S2 and S3, proximity sensing devices 115, 117 (FIG. 2) are monitored until an approaching wheel is detected. Once detected, by proximity sensing device 117, for example, step S4 includes resetting and starting the wheel timer, initiating the light measurement system, which may include opening shutters and turning on the illuminating devices, and, as shown in FIGS. 2 and 5, setting the leading/trailing sense for wheel sensing device 140, wheel brightness sensor 141 and proximity sensing device 117.

In step S5, wheel sensing device 140 from FIG. 10 is continually monitored for the passage of wheel 10. Once wheel 10 passes wheel sensing device 140 (times t1–t4 are available S6), step S7 calculates the wheel position, speed, and the trigger time ($t_m$) for operation of the light measurement system. In step S8, wheel brightness sensor 141 from FIG. 10 is read to determine the appropriate brightness of the illuminating devices used in the light measurement system. After waiting until the trigger time in step S9, at least one light sensing device 170, 172, 174 (FIG. 5) is triggered to sense the reflected light from wheel 10 (images) in step S10. The images are saved in S11 as wheel data, and the wheel sensor loop returns to step S5 for a subsequent wheel. If the wheel timer expires S12, the wheel sensor loop is exited. The wheel data for the various wheels are processed to determine any defects in step S13. Additionally, in step S14 the light measurement system is shut down, which may include turning off the illuminating devices and closing shutters. The loop then returns to S1 and recommences monitoring proximity sensing devices 115, 117 shown in FIG. 2.

While the processing of the data is shown occurring after all the wheels have exited the system, it should be noted that this processing can occur simultaneously to the wheel measuring. Additionally, while it is shown that the wheel measuring and wheel processing are performed by two separate control units (local control unit 157 and system control unit 120 of FIG. 5), it should be noted that the two functions can be performed by the same unit, for example, system control unit 120.

G. Wheel Attribute Measurement Method

Figure 13:
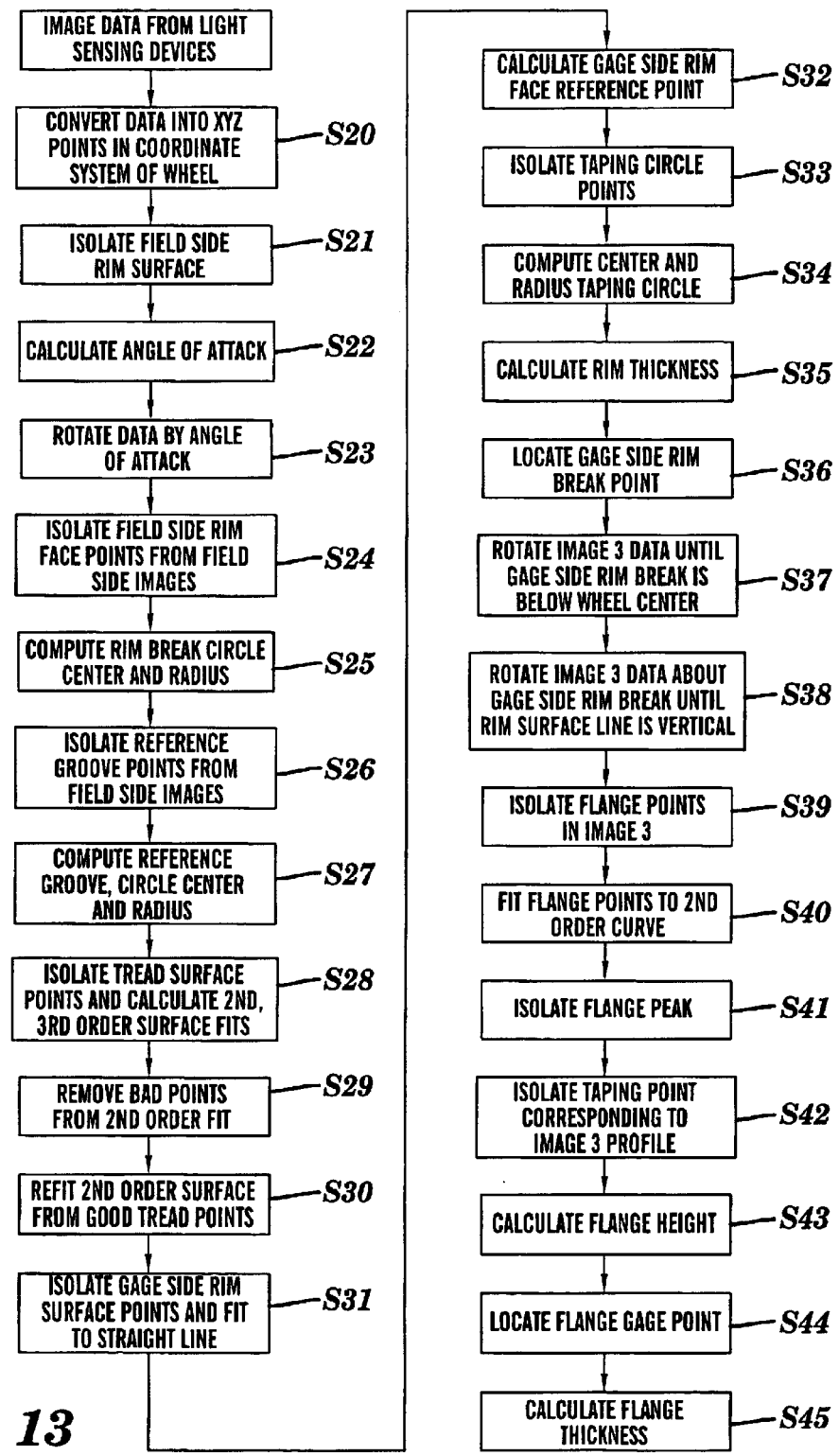
FIG. 13 is a flowchart of one embodiment of an image measurement method in accordance with the invention.

FIG. 13 provides a more detailed description of one embodiment of the wheel attribute measurement method for the wheel data from the reflected light sensed by light sensing devices 170, 172, 174 of FIG. 5. The wheel data includes analog values describing the sensed brightness of the reflected light (images). These values are converted to digital data by a light measurement system. In step S20, this data is converted into Cartesian points on the object surface using three dimensional structured light triangulation. This process is well known by those skilled in the art.

In one embodiment, referring to FIGS. 1A and 1B, field side rim face 30 points within the images are isolated in step S21. If available, any points associated with reference groove 34 are not included in this data. The angle that field side rim face 30 makes with the down rail horizontal axis (X) is then calculated in step S22. This corresponds to wheel angle of attack 58 with respect to the down rail horizontal axis (X). Using the data calculated in step S21, in step S23 the vertical line that comprises the intersection of field side rim face 30 and the plane X=0 is calculated and the data is rotated about this line by the negative of wheel angle of attack 58. This generates a new data set and reduces the complexity of the subsequent calculations.

Field side rim face 30 points are isolated from the new data corresponding to the two field side images in step S24. In step S25, the field side rim break circle radius is calculated using a standard circle fitting algorithm.

When present on the wheel, reference groove 34 points are isolated from the new data corresponding to the two field side images in step S26. Reference groove circle radius 36 and wheel centerline 18 are then computed using a standard circle fitting algorithm S27. This allows for the determination of the reference groove diameter.

Step S28 continues with the data corresponding to the two field side images, and tread surface 20 points are isolated and a tread surface 20 second order and higher order fit are computed. In step S29, a statistical analysis of the differences between the second and higher order tread surface fits is performed, and the 'bad' tread surface 20 data points are removed from the set of tread surface 20 points. A reduced set of tread surface 20 points then remain. In step S30, a new second order tread surface fit is produced using this reduced set.

Turning to gage side 16 image data, the gage side rim face 24 points are isolated and fitted to a straight line in step S31.

A gage side rim face reference point is calculated as the mean of the cross rail coordinates of the fitted line in step S32.

Using the second order tread surface fit from step S30, step S33 extracts the points on the tread surface 20 that are a specified cross rail distance from the gage side rim face reference point calculated in step S32. For example, for AAR 1B standard wheels, the set distance used would be 2.875 inches.

The extracted points define an arc of a circle defined by wheel radius 50. Step S34 uses a standard circle fitting algorithm and the extracted points to compute the wheel diameter and wheel centerline 18 that define a wheel circle. In step S35, rim thickness 46 is calculated as the difference between wheel radius 50 and the field side rim break circle radius as calculated in step S25.

Step S36 locates gage side rim break 26 from the gage side image data. In step S37, the gage side image data is rotated about the horizontal cross axis through wheel centerline 18 until the down rail coordinate of gage side rim break 26 is equal to the down rail coordinate of wheel centerline 18. In step S38, the rotated data is further rotated about a horizontal cross range axis through gage side rim break 26 until gage side rim face 24 points define a vertical line.

Using the new data from S38, flange 22 points are isolated in step S39. Flange 22 points are fitted to a second order curve in step S40. Step S41 calculates flange peak 38 as the peak of the second order curve from step S40.

In step S42, taping point 40 is determined as the point on the wheel circle with the smallest vertical coordinate. Flange height 48 is calculated as the difference of the vertical coordinates of flange peak 38 and taping point 40 in step S43.

Returning to the twice rotated gage image data from step S38, flange gage point 54 is located in step S44. Finally in step S45, flange thickness 52 is calculated as the difference between the cross rail horizontal coordinates of gage side rim face reference point and flange gage point 54.

The order of calculations as shown in FIG. 13 are only exemplary of the order of calculations. Calculations not dependent upon other calculations can be performed earlier or later. Several calculations may also be carried out in parallel.

All of the exemplary calculations are not necessary or additional measurements may be desired. For example, reference groove circle radius 36 is generally only measured on wheels located on locomotives. An exemplary wheel measurement not discussed above is a wheel set gage, defined as the distance between two wheels in a set, which can be easily calculated by those skilled in the art using the wheel data obtained by the invention.

IV. Alternatives

Throughout the discussion, three light emitting and light sensing devices are frequently used. It should be noted that more or less light emitting and light sensing devices may be appropriate for applications within the invention. Depending on the desired attribute(s) to be measured, a single light emitting and light sensing device pair may be appropriate or multiple light emitting and light sensing device pairs may be appropriate. Additionally, it should be apparent that light emitting device and light sensing device pairs and any other devices may be placed in any arrangement on one or both sides of a wheel and in any combination appropriate for the application.

In the previous discussion, it will be understood that the method steps discussed preferably are performed by a processor, executing instructions of program product stored in memory, such as CPU 302, program product 307 and memory 306 in FIG. 5. It is understood that the various devices, modules, mechanisms and systems described herein may be realized in hardware, software, or a combination of hardware and software, and may be compartmentalized other than as shown. They may be implemented by any type of computer system or other apparatus adapted for carrying out the methods described herein.

A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after the following: (a) conversion to another language, code or notation; and/or (b) reproduction in a different material form.

It should be readily apparent that the wheel measurement system provided herein can be incorporated as part of a larger system. Such additional functionality of the larger system may be independent of the wheel measurement system or incorporate some of the hardware/software of the wheel measurement system to implement the desired functionality. For example, when required, a wheel cleaning system can be incorporated to remove buildup of brake dust, grease, and the like from the wheel. Another example involves a wheel management system that includes reading identification tags present on many railcars so that attributes calculated by the invention can be associated with particular wheel sets and vehicles.

The foregoing description of various embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

What is claimed is:

1. A method of measuring an attribute of a wheel having a first side and a second side, the method comprising the steps of:

obtaining wheel data by:

illuminating a first portion of the first side of the wheel with a first plurality of paths of light from a first light illumination device; and sensing wheel data based on a first reflection of the first plurality of paths of light from the wheel; and performing a calculation on the wheel data to measure the attribute of the wheel.

2. The method of claim 1, wherein the obtaining step further comprises the steps of:

illuminating a second portion of the first side of the wheel with a second plurality of paths of light from a second light illumination device; and sensing wheel data based on a second reflection of the second plurality of paths of light from the wheel.

3. The method of claim 1, wherein the obtaining step further comprises the steps of:

illuminating a portion of second side of the wheel with a second plurality of paths of light from a second light illumination device;

sensing wheel data based a second reflection of the second plurality of paths of light from the wheel.

4. The method of claim 3, wherein the wheel is a railway wheel and the first side comprises a field side of the wheel and the second side comprises a gage side of the wheel.

5. The method of claim 1, wherein the first portion of the first side of the wheel comprises an area with a width of about 4 inches.

6. The method of claim 1, wherein the plurality of paths of light include a plurality of substantially parallel lines of light.

7. The method of claim 6, wherein the plurality of substantially parallel lines of light illuminate the first portion of the first side of the wheel in a substantially radial direction.

8. The method of claim 6, wherein the plurality of substantially parallel lines of light are each approximately a quarter inch apart.

9. The method of claim 1, further comprising the step of:

determining a start time for the obtaining step.

10. The method of claim 9, wherein the determining step includes:

sensing the wheel at a first position;

sensing the wheel at a second position wherein the second position is a first known distance from the first position and a second known distance from an optimum measurement position;

calculating a time difference between the sensing at the first position and the sensing at the second position; and calculating a start time for the obtaining step based on the time difference, the first known distance and the second known distance.

11. The method of claim 10, wherein the calculating a start time step includes calculating a speed of the wheel.

12. The method of claim 9, wherein the wheel is moving at a speed up to about fifty miles per hour.

13. The method of claim 1, further comprising the steps of:

measuring a wheel brightness for the wheel; and adjusting an illumination brightness for the first plurality of paths of light.

14. The method of claim 1, wherein the performing a calculation step includes:

determining a bad data point in the wheel data; and ignoring the bad data point to measure the attribute of the wheel.

15. The method of claim 1, wherein the first portion of the wheel is located on a first side of a lateral vertical wheel centerlite.

16. The method of claim 1, wherein the sensed wheel data comprises at least four data points from an area having a width of about one inch.

17. A wheel measurement system for measuring an attribute of a wheel having a first side and a second side, the wheel measurement system comprising:

a light measuring system for obtaining wheel data with light, the light measuring system including:

a first light illumination device on the first side of the wheel for illuminating a first portion of the wheel with a first plurality of paths of light; and a first light sensing device for sensing a first reflection of the first plurality of paths of light from the wheel and generating the wheel data; and a control unit, in communication with the light measuring system, for measuring the attribute of the wheel from the wheel data.

18. The wheel measurement system of claim 17, wherein a light sensing device includes a filter for filtering light.

19. The wheel measurement system of claim 17, wherein the light measuring system further comprises:

a second light illumination device on the first side of the wheel for illuminating a second portion of the wheel with a second plurality of paths of light; and a second light sensing device for sensing a second reflection of the second plurality of paths of light from the wheel and generating wheel data.

20. The wheel measurement system of claim 19, further including a wheel brightness system for sensing a brightness of the wheel; wherein the control unit adjusts the brightness of the first light illumination device and the second light illumination device based on the brightness of the wheel.

21. The wheel measurement system of claim 17, wherein the light measuring system further comprises:

a second light illumination device on the second side of the wheel for illuminating a second portion of the wheel with a second plurality of paths of light; and a second light sensing device for sensing a second reflection of the second plurality of paths of light from the wheel and generating wheel data.

22. The wheel measurement system of claim 21, wherein a plurality of wheel attributes are measured.

23. The wheel measurement system of claim 22, wherein the plurality of wheel attributes include a rim thickness, flange thickness, a flange height, a wheel diameter and a wheel angle of attack.

24. The wheel measurement system of claim 23, wherein the plurality of wheel attributes further includes a reference groove circle radius.

25. The wheel measurement system of claim 17, wherein the control unit includes:

a local control unit for controlling the first light illumination device and the first light sensing device; and a system control unit, in communication with the local control unit, for calculating the attribute of the wheel.

26. The wheel measurement system of claim 17, further comprising:

a wheel sensing system in communication with the control unit.

27. The wheel measurement system of claim 26, wherein the wheel sensing system includes a wheel presence system for sensing a presence of the wheel; and wherein the wheel presence system is a known distance from the light measuring system.

28. The wheel measurement system of claim 27, wherein the wheel presence system includes:

a first sensor disposed near path of the wheel; and a second sensor disposed near the path of the wheel wherein the second sensor is a known distance from the first sensor.

29. The wheel measurement system of claim 28, wherein the control unit determines a time that the wheel is in a range of the light measuring system.

30. The wheel measurement system of claim 28, wherein the first sensor includes a magnetic sensor and the second sensor includes a magnetic sensor.

31. The wheel measurement system of claim 26, wherein the wheel sensing system includes a wheel brightness system or sensing a brightness of the wheel.

32. The wheel measurement system of claim 31, wherein the control unit adjusts the brightness of a light illumination device based on the brightness of the wheel.

33. The wheel measurement system of claim 17, wherein the plurality of paths of light produce a plurality of substantially parallel lines of light.

34. The wheel measurement system of claim 33, wherein the plurality of substantially parallel lines of light illuminate the first portion of the wheel in a substantially radial direction.

35. The wheel measurement system of claim 17, wherein the first light illumination device and the first light sensing device are disposed below a rail.

36. The wheel measurement system of claim 17, wherein the first light illumination device and the first light sensing device are attached to a rail.

37. A wheel measurement system for measuring an attribute of a wheel having a first side and a second side, the wheel measurement system comprising:
  means for obtaining wheel data with light, the means for obtaining wheel data including:
    means for illuminating a first portion of the first side of the wheel with a first plurality of paths of light from a single light illumination device; and
    means for sensing heel data based on a first reflection of the first plurality of paths of light from the wheel; and
  means for measuring an attribute of the wheel using the wheel data, wherein the means for measuring includes:
    means for determining if the wheel data includes a bad data point; and
    means for ignoring the determined bad data point to measure the attribute of the wheel.

38. The wheel measurement system of claim 37, wherein the means for obtaining wheel data further includes:
  means for illuminating a second portion of the first side of the wheel with a second plurality of paths of light; and
  means for sensing wheel data based on a second reflection of the second plurality of paths of light from the wheel.

39. The wheel measurement system of claim 37, wherein the means for obtaining wheel data further includes:
  means for illuminating a second portion of the second side of the wheel with a second plurality of paths of light; and
  means for sensing wheel data based on a second reflection of the second plurality of paths of light from the wheel.

40. The wheel measurement system of claim 37, further comprising:
  means for detecting a presence of the wheel; and
  means for determining a start time for the means for sensing a first reflection.

41. The wheel measurement system of claim 37, further comprising:
  means for detecting a brightness of the wheel.

42. The wheel measurement system of claim 37, wherein the first plurality of paths of light include a plurality of substantially parallel lines of light.

43. The wheel measurement system of claim 42, wherein the plurality of substantially parallel lines of light illuminate the first portion of the first side of the wheel in a substantially radial direction.

44. A method of determining a start time for measuring an attribute of a wheel on a rail that supports the wheel with a measuring device, the method comprising the steps of:
  attaching a first magnetic sensor to the rail;
  attaching a second magnetic sensor to the rail wherein the second magnetic sensor is a known distance from the first magnetic sensor and a known distance from the measuring device;
  determining a first period that the wheel is detected by the first magnetic sensor;
  determining a second period that the wheel is detected by the second magnetic sensor; and
  calculating the start time for measuring using the first period, the second period and the known distance from the measuring device.

45. The method of claim 44, wherein the calculating the start time step includes calculating a speed of the wheel.

46. A method of measuring an attribute of a wheel using a path of light, the method comprising the steps of:
  determining a brightness of the wheel using a first system;
  adjusting a brightness of a path of light based on the brightness of the wheel, wherein the path of light is generated using a second system that is independent of the first system;
  illuminating a portion of the wheel with the path of light;
  sensing wheel data based on a reflection of the path of light from the wheel; and
  performing a calculation on the wheel data to measure the attribute of the wheel.

47. The method of claim 46, wherein the illuminating step uses a plurality of paths of light.

48. A computer program product comprising a computer useable medium having computer readable program code embodied therein for measuring an attribute of a wheel, the program product comprising:
  program code configured to control a light illumination device for illuminating the wheel with a plurality of paths of light;
  program code configured to control a light sensing device that obtains wheel data based on a sensed reflection; and
  program code configured to perform a calculation on the wheel data to measure the attribute of the wheel, wherein the program code configured to perform a calculation includes:
    program code configured to determine if the wheel data includes a bad data point; and
    program code configured to ignore the determined bad data point to measure the attribute of the wheel.

49. The computer program product of claim 48, further comprising:
  program code configured to determine a start time for illuminating the wheel and a start time for obtaining the wheel data.

50. The computer program product of claim 48, further comprising:
  program code configured to determine a brightness of the wheel; and
  program code configured to adjust a brightness of a plurality of paths of light based on the brightness of the wheel.

* * * * *